United States Patent
Oroskar et al.

(10) Patent No.: US 7,978,674 B1
(45) Date of Patent: Jul. 12, 2011

(54) METHOD FOR SELECTING RESOURCE-ALLOCATION TYPE IN A WIRELESS COMMUNICATION SYSTEM

(75) Inventors: Siddharth S. Oroskar, Overland Park, KS (US); Manoj Shetty, Overland Park, KS (US); Sachin R. Vargantwar, Overland Park, KS (US); Deveshkumar Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 715 days.

(21) Appl. No.: 12/032,926

(22) Filed: Feb. 18, 2008

(51) Int. Cl.
*H04B 7/216* (2006.01)
(52) U.S. Cl. ............ 370/342; 370/335; 455/452.1; 455/522
(58) Field of Classification Search ........ 455/404.2, 455/422.1, 436, 440–444, 447, 450, 452.1, 455/452.2, 453, 456.1, 522; 370/329–332, 370/335, 341, 342, 310, 318, 320, 322
See application file for complete search history.

(56) References Cited

U.S. PATENT DOCUMENTS

| | | | | |
|---|---|---|---|---|
| 6,134,220 A * | 10/2000 | Le Strat et al. | ............ | 370/252 |
| 6,542,484 B1 * | 4/2003 | Ovesjo et al. | ............ | 370/335 |
| 6,714,789 B1 * | 3/2004 | Oh et al. | ............ | 455/456.1 |
| 6,944,147 B2 * | 9/2005 | Chheda | ............ | 370/342 |
| 6,980,811 B2 | 12/2005 | Harris | | |
| 7,505,438 B2 * | 3/2009 | Tayloe et al. | ............ | 370/335 |
| 7,505,439 B2 * | 3/2009 | Chiang et al. | ............ | 370/335 |
| 7,519,026 B1 * | 4/2009 | Oh | ............ | 370/331 |
| 2004/0120290 A1 | 6/2004 | Makhijani et al. | | |
| 2004/0192315 A1 * | 9/2004 | Li et al. | ............ | 455/447 |
| 2010/0278137 A1 * | 11/2010 | Kwon et al. | ............ | 370/330 |

* cited by examiner

*Primary Examiner* — Anthony S Addy

(57) ABSTRACT

A method of selecting a type of resource-allocation to use for a call in a cellular wireless system, such as selecting a type of radio configuration to use for the call. According to the method, resource-availability in one more adjacent coverage areas may be used as a basis to select the type of resource-allocation to use in a current coverage area. For instance, given the choice between a radio configuration that consumes less base station power and a radio configuration that consumes more base station power, the radio configuration consuming more base station power may be selected if base station sufficient power is available in one or more adjacent coverage area(s), and the other radio configuration may be selected if insufficient base station power is available in the one or more adjacent coverage area(s). Distance between the mobile station and a current base station may be considered as well.

18 Claims, 4 Drawing Sheets

METHOD FOR SELECTING RESOURCE-ALLOCATION TYPE IN A WIRELESS COMMUNICATION SYSTEM

BACKGROUND

Cellular wireless is an increasingly popular means of personal communication in the modern world. People are using cellular wireless networks for the exchange of voice and data over cellular telephones, Personal Digital Assistants ("PDAs"), cellular modems, and other mobile stations. In principle, a user can seek information over the Internet or call anyone over a Public Switched Telephone Network ("PSTN") from any place within coverage of the cellular wireless network.

A typical cellular wireless system includes a number of base stations that radiate to define wireless coverage areas, such as cells and cell sectors, in which mobile stations can operate. In turn, each base station is typically coupled with equipment that provides connectivity with one or more transport networks, such as the public switched telephone network (PSTN) and/or the Internet for instance. With this arrangement, a mobile station operating within a coverage area of any base station can engage in air interface communication with the base station and can thereby communicate via the base station with various remote network entities.

In practice, communications over the air interface between a base station and a mobile station are structured in accordance with a particular air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each protocol may define its own procedures for initiation of calls, handoff between coverage areas, and functions related to air interface communication.

Further, each base station in a cellular wireless system has various air interface resources that the base station can allocate for use to serve mobile stations operating in its coverage area(s). For example, in each coverage area, the base station may have a limited amount of transmission power (e.g., a maximum power level of the base station's power amplifier), and the base station may need to allocate that power among concurrent communications with mobile stations. As another example, in each coverage area, the base station may have a limited frequency spectrum, and the base station may need to allocate portions of that spectrum among concurrent communications with mobile stations. And as still another example, in each coverage area, the base station may have a limited supply of codes to use for encoding air interface communications, and the base station may need to divvy those codes among concurrent communications as well.

As a specific example, each coverage area in a spread spectrum system uses orthogonal spreading codes to uniquely define communication channels on the air interface, and in order to preserve distinctions (orthogonality) between the codes, a limited number of such codes exists. Each sector or other coverage area of a CDMA spread spectrum system, for instance, has a limited set of Walsh codes that are used to define various air interface channels. Typically, a small number of those Walsh codes are reserved for use to encode overhead control channels, while the remainder of the Walsh codes are assigned on an as-needed basis to encode bearer traffic channels for voice or data calls.

As each CDMA sector has a limited number of Walsh codes, each sector can support a limited number of concurrent calls. Furthermore, this limitation becomes more complex because most CDMA systems allow for multiple types of air interface encoding, with each type consuming a different amount of spreading resources as well as a different amount of total available base station power.

Under the well known CDMA2000 standard, for instance, at least two different "radio configurations" are defined—"RC3" and "RC4". RC3 is typically used for voice calls, and RC4 is typically used for data calls, however a base station may generally select either configuration for a given call.

Each of these radio configurations uses different length Walsh codes that provide different amounts of spreading, and each radio configuration tends to consume a different amount of base station power. In particular, each RC3 call uses a 64-bit Walsh code that provides more spreading and consumes less base station power, while each RC4 call uses a 128-bit Walsh code that provides less spreading and consumes more base station power. In terms of orthogonal coding resources available in a given sector, each 128-bit Walsh code uses about one half the resources of a 64-bit Walsh code. As a result, a given CDMA sector can generally support (i) a particular number of RC3 calls, (ii) twice as many RC4 calls, (iii) or some combination of RC3 calls and RC4 calls. (Additional radio configurations may be available as well, which may further increase complexity.)

Overview

When a cellular wireless system sets up a call for a mobile station in a given coverage area (or when a call is being handed off into the coverage area), the system may need to select a type of resource-allocation to use for the call. For example, the system may have various types of resources or various types of a given resource, and the system may need to select which type of resource to allocate for the call. And as another example, the system may have various procedures or mechanisms for allocating resources, and the system may need to select which procedure or mechanism to use for allocating resources for the call.

As a specific example, a system that has different radio configurations may need to decide which radio configuration to use for the call, taking into consideration various resource limitations of the system. In CDMA, for instance, the system may need to decide whether to use RC3 or RC4, and thus whether to use a 64-bit Walsh code for the call (thereby consuming more spreading resources and less base station power) or a 128-bit Walsh code for the call (thereby consuming less spreading resources and more base station power). The decision of whether to use RC3 or RC4 can be made based on factors including (i) whether the call is a voice call or a data call, (ii) how many Walsh codes (or spreading resources) are left in the sector, and (iii) how much power is left in the sector.

The present method stems from a realization, however, that the type of resource-allocation selected for a call in a given coverage area may significantly impact system performance when the call is later handed off to an adjacent coverage area, particularly if the same resource-allocation will be used for the call in the new coverage area. In many CDMA systems, for instance, the radio configuration used for a call will be persistent as the call is handed off from one coverage area to another. Thus, if a call is set up as an RC3 call in one sector, the call would remain an RC3 call when it is handed off into another sector. Likewise, if the call is set up as an RC4 call in one sector, the call would remain an RC4 call when it is handed off into another sector.

A potential problem with this persistence is that the adjacent coverage area may not have sufficient base station power to support the existing radio configuration of the call. For instance, if the call is initiated as an RC4 call in one sector and the call then moves into another sector that does not have sufficient base station power to support an RC4 call, the call could be dropped, which would create a poor user experience. Other examples are possible as well.

To help avoid this problem, the present method provides for using resource availability in at least one adjacent coverage area as a basis to decide which type of resource-allocation to use for a call in a current coverage area. For instance, when deciding whether to use RC3 or RC4 for a call in a current coverage area, the cellular wireless system can evaluate power availability in one or more adjacent coverage areas (served by one or more other base stations). If the system determines that adequate power is available in the adjacent coverage area(s), then the system may decide to use RC4 for the call in the given coverage area, since RC4 would consume less spreading code resources and thus potentially allow for a greater number of additional calls. On the other hand, if the system determines that insufficient power is available in the adjacent coverage area(s), then the system may decide to use RC3 for the call in the current coverage area, to help increase the likelihood of successful handoff.

Furthermore, in this analysis, the system may take into consideration how far away the mobile station is from its current base station. If the system determines that the mobile station is less than a threshold distance away from the current base station, then the system may conclude that handoff to the coverage area of another base station is unlikely, and the system may therefore select a radio configuration without considering power availability in any adjacent coverage area. On the other hand, if the system determines that the mobile station is more than the threshold distance away from the current base station, then the system may conclude that handoff to an adjacent coverage area is more likely, and the system may therefore select a radio configuration based on power availability in one or more adjacent coverage areas.

Thus, when a cellular wireless system is deciding what type of resource-allocation to use for a mobile station's call in a coverage area of a given base station, the system may determine the distance between the mobile station and the base station, and the system may then use that distance as a basis to decide whether to base the selection of resource-allocation on resource-availability in an adjacent coverage area. If the determined distance is less than a threshold, then the system may select a type of resource-allocation without considering resource-availability in any adjacent coverage area. Whereas, if the system determines that the mobile distance is greater than the threshold (or than some other threshold), the system may use resource-availability in one or more adjacent coverage areas (served by one or more other base stations) as a basis to select a type of resource-allocation for use in the current coverage area.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

For illustration, the present method will be described with respect to CDMA communications and particularly with respect to selecting a radio configuration to use for a call in a current sector based on power availability in one or more adjacent sectors. It should be understood, however, that the method could apply equally with respect to other air interface protocols, other types of resource-allocation, other types of resource-availability, and other types of wireless coverage areas. Other variations are possible as well.

Figure 1:
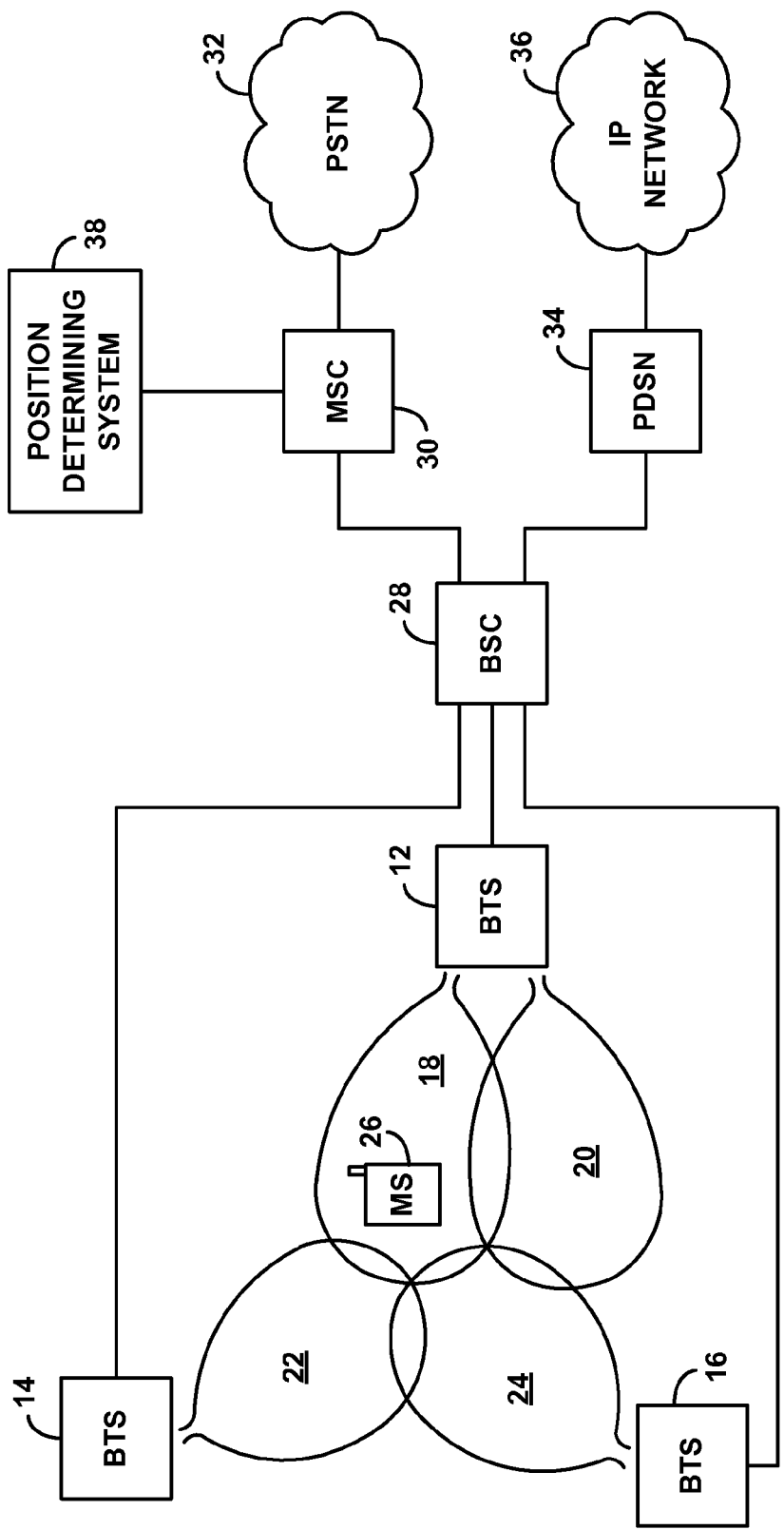
FIG. 1 is a simplified block diagram of a network in which an exemplary embodiment of the present method can be implemented.

Referring to the drawings, FIG. 1 is a simplified block diagram of an exemplary communication system in which the present method can be implemented. As shown, the system includes a plurality of base transceiver stations (BTSs) 12, 14, 16, each radiating to define one or more sectors. In particular, the figure depicts BTS 12 radiating to define at least two sectors 18, 20, BTS 14 radiating to define at least one sector 22, and BTS 16 radiating to define at least one sector 24. Shown operating within the coverage of sector 18 (served by BTS 12) is a representative mobile station (i.e., wireless communication device, whether fixed in position or movable) 26. Numerous mobile stations may be operating concurrently in the various sectors shown. However, for simplicity, only one mobile station is shown.

All three BTSs 12, 14, 16 are shown coupled with a base station controller (BSC) 28, which functions to control various BTS operations as well as aspects of air interface operation, such as handoff of calls between BTS sectors. (In an alternative embodiment, the BTSs may be served by different BSCs or may incorporate BSC-like functionality; other arrangements are possible as well.) BSC 28 is then coupled with a mobile switching center (MSC) 30, which provides connectivity with the public switched telephone network (PSTN) 32, and BSC 28 is further coupled with a packet data serving node (PDSN) 34, which provides connectivity with a packet-switched network 36, such as the Internet for instance. In addition, MSC 30 is coupled with a position determining system 38, which operates in a known manner to facilitate determining the location (e.g., GPS coordinates, or a more coarse location) of a mobile station served by the system. Position determining system 38 may also be accessible via packet-switched network 36.

In a preferred embodiment, the present method can be implemented at a BTS, at a BSC, and/or at any other component of the system. For instance, the method may be implemented by BTS 12, BSC 28, and/or MSC 30. Each such component, as well as other network components in the system, will preferably include a processor (e.g., one or more general purpose processors and/or dedicated processors), data storage (e.g., one or more volatile and/or non-volatile storage components) containing program logic executable by the processor to carry out functions described herein, and a network connection mechanism to facilitate communication with other components of the system. Alternatively, the method could be implemented at least in part by other entities and/or by other types of logic (such as hardware logic for instance). Other implementation mechanisms are possible as well.

Preferably, the method will be implemented at the time a call is being admitted into one of the sectors shown, such as when the call is being initiated in the sector or when the call is being handed off into the sector. For instance, the method may be implemented with respect to a call that is being initiated to or from mobile station 26 in sector 18. Alternatively, the method may be implemented at some other time with respect to a call in a given sector, such as if a change of resource-allocation type is being made during an existing call.

The call at issue can be a voice call (e.g., a call placed over PSTN 32), a data call (e.g., a wireless packet data session (e.g., for HTTP, SIP, VoIP, media streaming, etc.), often referred to as a "call"), or some other type of call that will use air interface traffic channel resources in the sector. The manner in which the call is initiated in the sector can vary depending on the type of call (e.g., voice or data), the version of air interface protocol being used, and/or other factors.

By way of example, under CDMA2000, mobile station 26 may originate a call (voice or data) by transmitting an origination message on an air interface access channel to BTS 12, providing in the origination message a service option code that designates whether the call is a voice call or a data call. Upon receipt of the origination message, BTS 12 would signal to BSC 28, and BSC 28 would in turn signal to MSC 30. At the instruction of MSC 30, BSC 28 may then direct BTS 12 to assign an air interface traffic channel for the call, and thus BSC 28 and/or BTS 12 would then decide whether to use RC3 or RC4 for the call, and BTS 12 would accordingly assign a Walsh code (64-bit if RC3, or 128-bit if RC4). BTS 12 would then transmit an enhanced channel assignment message (ECAM) on an air interface paging channel to mobile station, informing the mobile station what Walsh code to use for the call.

If the call is a legacy voice call, MSC 30 may then work to set up the call via PSTN 32 to the called party. On the other hand, if the call is a data call, BSC 28 may signal to PDSN 34, to trigger establishment of a data link layer connection between PDSN 34 and mobile station 26, and assignment of a mobile-IP address to allow mobile station 26 to communicate on packet-switched network 36.

Likewise, if MSC 30 receives a signaling message requesting establishment of a voice call to mobile station 26, MSC 30 may instruct BSC 28 to page mobile station 26, and BSC 28 may direct BTS 12 to assign an air interface traffic channel for the call, with BSC 28 and/or BTS 12 deciding whether to use RC3 or RC4 for the call. Similarly, if BSC 28 receives packet data destined to mobile station 26 at a time when mobile station 26 does not have an air interface traffic channel (i.e., when mobile station 26 is dormant), BSC 28 may page the mobile station and assign a traffic channel, again with BSC 28 and/or BTS 12 deciding whether to use RC3 or RC4 for the call.

As noted above, FIG. 1 also depicts a position determining system 38 in communication with MSC 30. Position determining system 38 may function or assist in determining the geographic position coordinates of a given mobile station such as mobile station 26. Applying industry standards, for instance, position determining system 38 may cause mobile station 26 to measure phase delays of pilot signals that mobile station 26 receives from various base stations and to report those measurements to position determining system 38. Position determining system 38 may then use those measurements to approximate the location of mobile station and may report that location to a querying entity. In addition, if a more precise indication of location is desired, position determining system 38 may use the approximated location of the mobile station to identify GPS satellites that should be the sky over the mobile station 26, and position determining system 38 may then direct the mobile station to record and report information regarding signals it receives from those satellites. Using that information, the position determining system may then more accurately determine the geographic coordinates of the mobile station and likewise report the determined location to a querying entity.

Through communication with position determining system 38, a network component such as BTS 12 and/or BSC 28 can thus determine the location (e.g., GPS coordinates) of the mobile station 26. Alternatively, mobile station 26 may itself be able to determine its GPS coordinates in much the same way that conventional handheld navigation units do, or mobile station 26 may be able to determine its location through communication with position determining system 38. Mobile station may then report its determined location to the BTS 12, and BSC 28, within a call origination message or page response message for instance, to enable BTS 12, BSC 28, and/or another entity to use the location in the context of the present method.

As noted above, the present method is directed to selecting a type of resource-allocation to use for a call that is being set up in a wireless coverage area, so that the wireless communication system can then allocate resources (i.e., one or more resources) for the call in accordance with the selected type of resource-allocation. In the arrangement of FIG. 1, for instance, the method can be implemented by BTS 12 and/or BSC 28 to select between RC3 and RC4 for a call that is being set up to or from mobile station 26 in sector 18. In accordance with the selection, the system (e.g., BTS 12 and/or BSC 28) can then assign a Walsh code to be used for the call. In particular, if the system selects RC3, then the system may assign a 64-bit Walsh code to be used for the call, and if the system selects RC4, then the system may assign a 128-bit Walsh code to be used for the call. The system may assign additional Walsh codes or other resources for use in connection with the call as well.

Figure 2:
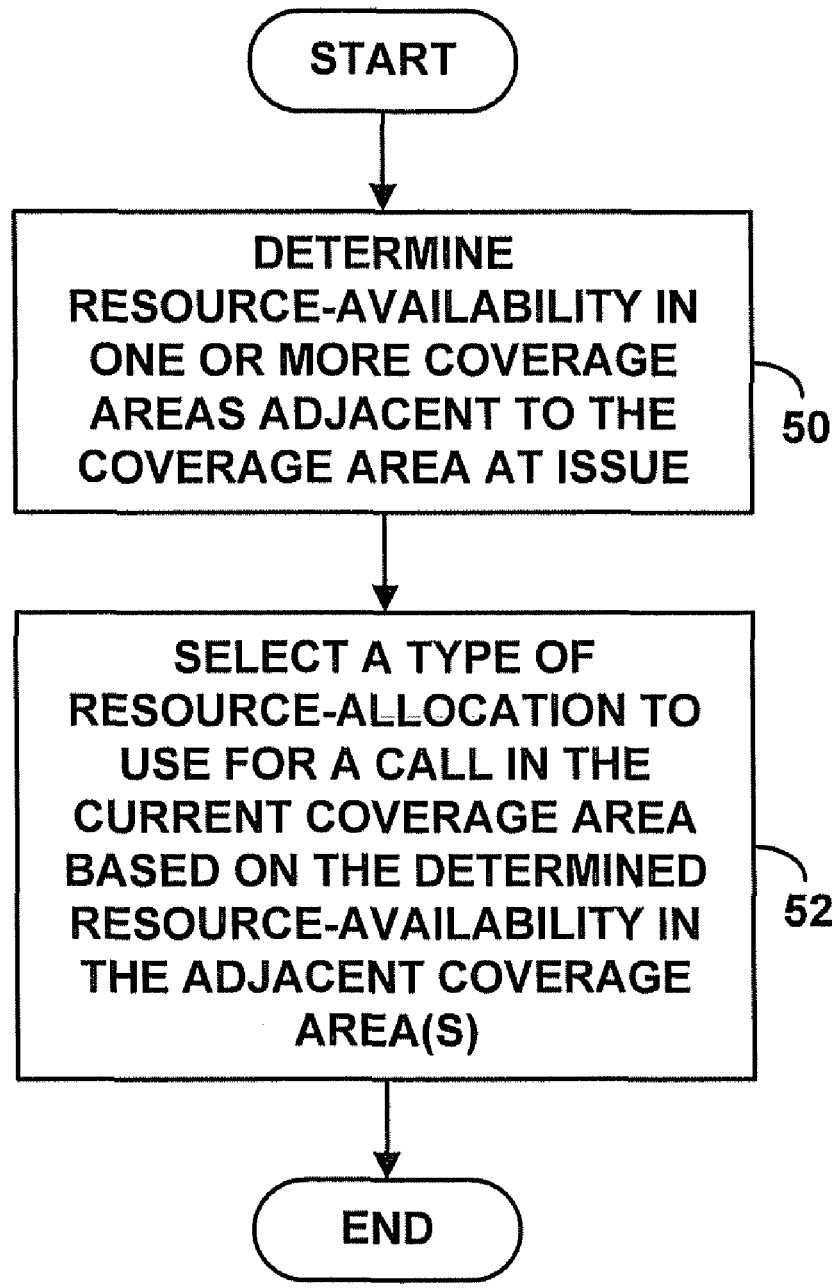
FIG. 2 is a flow chart depicting a set of functions that can be carried out in accordance with the exemplary method.

FIG. 2 is a flow chart depicting functions that can be carried out in accordance with the method, to facilitate selection of a resource-allocation type for the call in a given coverage area. As shown in FIG. 2, at step 50, the system determines resource-availability in one or more coverage areas adjacent to the given coverage area. For instance, in the arrangement of FIG. 1, the system may determine that sectors 20, 22, and 24 are adjacent to sector 18 (the sector at issue), and the system may then determine resource-availability in those adjacent sectors or in a subset of those adjacent sectors. At step 52, the system then selects the type of resource-allocation based on the determined resource-availability. For instance, if the system determines that less than a threshold extent of a particular resource is available in the adjacent sector(s), then the system may select a particular type of resource-allocation to use for the call in sector 18. On the other hand, if the system determines that more than the threshold extent of the particular resource is available in the adjacent sector(s), then the system may select another type of resource-allocation to use for the call in sector 18.

To carry out these functions in practice, the system will need to identify the one or more coverage areas adjacent to the coverage area at issue. In CDMA, this can be done by simply referencing the "neighbor list" for the sector at issue, as the neighbor list specifies neighboring sectors to which a mobile station could theoretically hand off. The neighbor list for sector 18 may be maintained in data storage at BSC 28. Thus, in practice, BSC 28 may refer to the neighbor list for sector 18 to identify the one or more sectors adjacent to sector 18.

Alternatively, another process could be used to identify adjacent coverage areas. Other mechanisms for identifying adjacent coverage areas could be used as well.

Note also that an "adjacent" coverage area could in theory be substantially coterminous with the coverage area at issue, such as where two coverage areas exist in the same location but use different parameters (e.g., different carrier frequencies, etc.) Further, an adjacent coverage area may or may not be served by the same base station as the coverage area at issue. For instance, coverage areas adjacent to sector 18 may include sectors 20, 22, and 24 as shown in FIG. 1 or may include only sectors 22 and 24 (served by other base stations).

Once the system has identified the one or more adjacent coverage areas, the system will then determine resource-availability in the one or more adjacent coverage areas. Doing so may involve evaluating resource-data for each such coverage area, possibly querying one or more other entities to obtain the resource-data. For instance, the BSC 28 may query the BTS of an adjacent coverage area to obtain the resource-data for the adjacent coverage area or may refer to its own data if it serves the adjacent coverage area as well.

The resource at issue in the adjacent coverage area(s) can take various forms. In the preferred embodiment, however, the resource at issue will be base station transmission power in the adjacent coverage area(s), since power-availability may impact the ability of the system to maintain an existing RC4 call and, as presently envisioned, may thus impact the initial decision of whether to use RC3 or RC4 for the call.

The base station power available in a given sector may be a measure of the extent to which the BTS power amplifier for that sector has unused power, available for use to support additional calls or the like. As such, the BTS of the sector may have a record of how much of its power amplifier's maximum power is currently in use or allocated for use, and thus how much of the maximum power remains available for use or allocation. Consequently, BSC 28 may determine the base station power availability for a given sector by querying the BTS of the sector. Alternatively, in some embodiments, BSC 28 may itself maintain data on base station power availability, if the BSC manages BTS power allocation for instance, and so BSC 28 may not need to query the BTS to determine the power availability.

The selection of resource-allocation type may then be based on power-availability in all of the coverage areas (one or more coverage areas) known to be adjacent to the coverage area at issue. For instance, if sectors 20, 22, and 24 were the only sectors known to be adjacent to sector 18 (e.g., the only sectors on the neighbor list of sector 18), then BSC 28 could evaluate power availability in all of sectors 20, 22, and 24, determining for each sector whether it has sufficient available power. The selection of resource-allocation type (e.g., RC3 vs. RC4) could then be made based on whether all of the adjacent coverage areas have sufficient available power or not. If all of the adjacent coverage areas are deemed to have sufficient available power, then the system may select a particular type of resource-allocation (e.g., RC4) to use for the call. On the other hand, if any of the adjacent coverage areas is deemed to not have sufficient available power, then the system may select another type of resource-allocation (e.g., RC3) for the call.

Alternatively, the selection of resource-allocation type could be based on whether at least some percentage (or other extent) of adjacent coverage areas is deemed to have sufficient available power. For instance, if at least a certain percentage (e.g., 60%) of the adjacent sectors is deemed to have sufficient available power, then the system may select one type of resource-allocation (e.g., RC4) to use for the call. Whereas, if less than that percentage of the adjacent sectors is deemed to have sufficient available power, then the system may select another type of resource-allocation (e.g., RC3) to use for the call. To make this determination, the BSC 28 could evaluate each adjacent sector, flagging the sector as either having sufficient available power or not having sufficient available power. The BSC may then determine what percent of the adjacent sectors are flagged as having sufficient available power and determine if that percent meets a defined threshold.

Still alternatively, the selection of resource-allocation type could be based on a subset of the adjacent coverage areas, where the subset consists of those coverage areas deemed to be the most likely candidates for handoff of the mobile station from the coverage area at issue. For example, the system could select as the subset one or more of the adjacent coverage areas that the mobile station has reported having the strongest reported forward link signal strengths. Under CDMA, for instance, mobile station 26 may transmit pilot signal measurement messages (PSMMs) to the BSC 28, indicating measured pilot signal strengths for various sectors on its neighbor list or the like. BSC 28 may maintain a record of those pilot strength measurements, and BSC 28 may then use those measurements as a basis to select the most relevant adjacent sectors. For instance, BSC 28 could rank the adjacent sectors in order of their reported pilot strengths, and BSC 28 may then select the top N (any designated number, one or more) of the ranked sectors to use as the adjacent sectors. Given a subset of the adjacent sectors, the BSC may then determine whether at least a threshold extent of those sectors has sufficient available power, and may base the selection of resource-allocation type on that determination.

Figure 3:
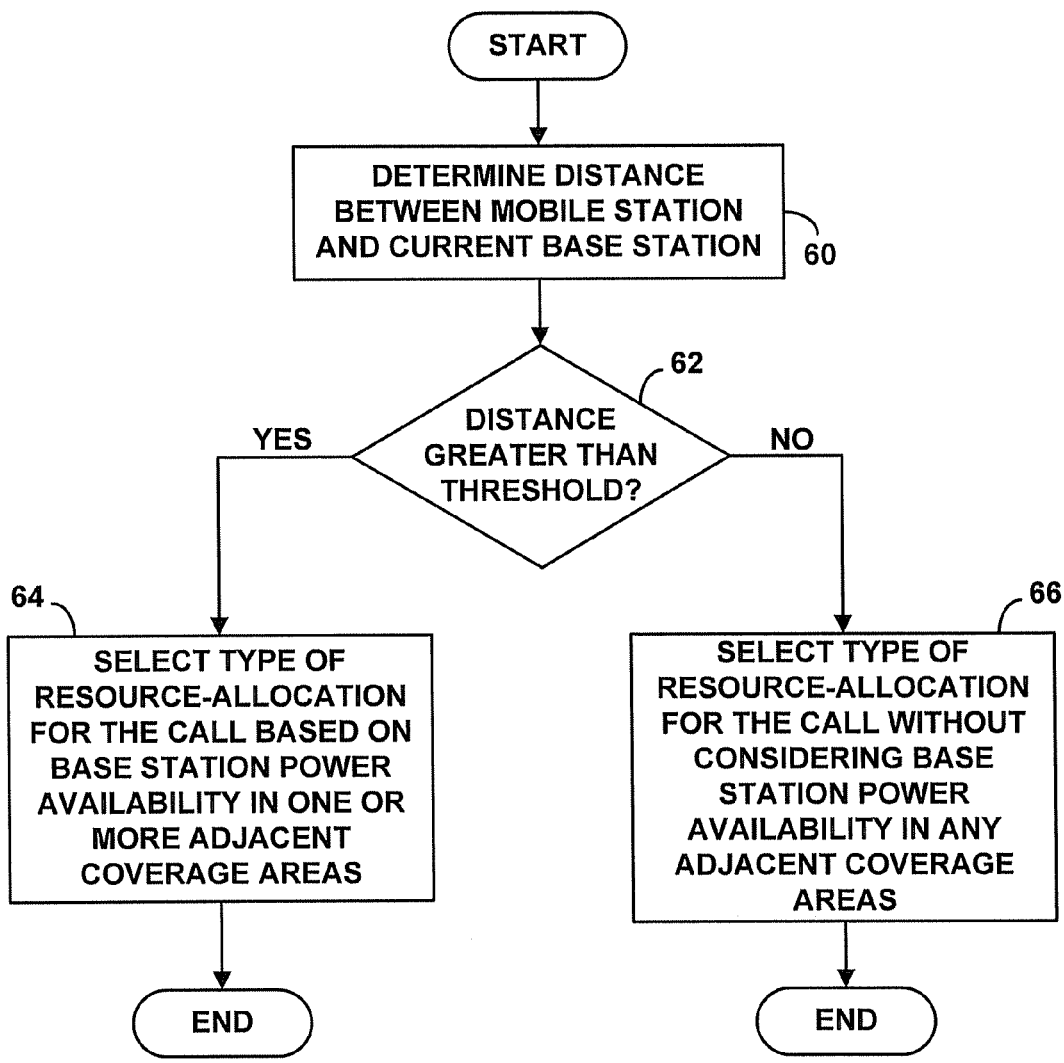
FIG. 3 is another flow chart depicting a set of functions that can be carried out in accordance with the exemplary method.

FIG. 3 is next a flow chart depicting another set of functions that can be carried out in accordance with the method, again to facilitate selection of a resource-allocation type for a call in a given coverage area. This figure illustrates that the system may consider how far away the mobile station is from the current base station, as a factor in deciding whether to use power-availability in one or more adjacent coverage areas as a basis to select resource-allocation type.

As shown in FIG. 3, at step 60, the system determines a distance between the mobile station and the current base station. At step 62, the system then determines whether the determined distance is greater than a threshold distance. If the system finds that the determined distance is greater than the threshold distance, then, at step 64, the system selects the type of resource-allocation based on base station power availability in one or more coverage areas adjacent to the given coverage area (using any of the processes described above for instance). On the other hand, if the system finds that the determined distance is not greater than the threshold distance, then, at step 66, the system selects the type of resource-allocation without considering base station power availability in any adjacent coverage area.

If the resource-allocation at issue is a radio configuration such as RC3 and RC4, then this method would result in selecting the radio configuration based on power availability in the adjacent coverage area(s) if the mobile station is far enough away from its current base station, or selecting the radio configuration without consideration of power availability in any adjacent coverage area (perhaps simply selecting RC4) if the mobile station is not far enough away from its current base station. This embodiment would work particularly well where the adjacent coverage areas are served by other base stations. It may be less applicable with respect to an adjacent coverage area that is served by the same base station as the mobile station's current coverage area.

In this method, the act of determining the distance between the mobile station and the current base station can take any form, with any desired degree of precision. For example to compute the distance between mobile station 26 and base station 12, BSC 28 and/or BTS 12 could use round trip delay measurements, computing the time it takes a signal to be sent from the base station to the mobile station and then back to BTS 12, and using half of that time to compute (based on the speed of light) the distance between the mobile station and the BTS. As another example, to compute the distance between mobile station 26 and base station 12, BSC 28 and/or BTS 12 may query the mobile station or position determining system 38 to determine geographic coordinates of the mobile station and may compute a geometric distance between those coordinates and known geographic coordinates of BTS 12.

In addition, the system may dynamically establish the distance threshold based on the distance between the current base station and at least one adjacent base station, possibly using a higher threshold if that distance is longer, and using a shorter threshold if that distance is shorter. For instance, BSC 28 may compute a geometric distance between BTS 12 and BTS 14, based on known geographic coordinates of those base stations, and BSC 28 can determine a distance that is a defined fraction (e.g., ⅓) of that computed geometric distance. The BSC may make this calculation for each of the adjacent base stations and may use as the threshold some combination (e.g., average) of those determined distances from the current base station.

Furthermore, the act of selecting a type of resource-allocation may comprise selecting a type of air interface or radio configuration, such as RC3 or RC4. In particular, each coverage area in the system may have at least two air interface types that can be used for calls, including one type that uses spreading codes of a particular length, and another type that uses spreading codes of a longer length. The act of selecting the type of resource-allocation may thus involve selecting from at least those two air interface types an air interface type to use for the call, and thus selecting a type of spreading code to use for the call. In addition, the selection of a type of resource-allocation can be based on other factors as well, such as whether the call is a voice call or a data call for instance.

Figure 4:
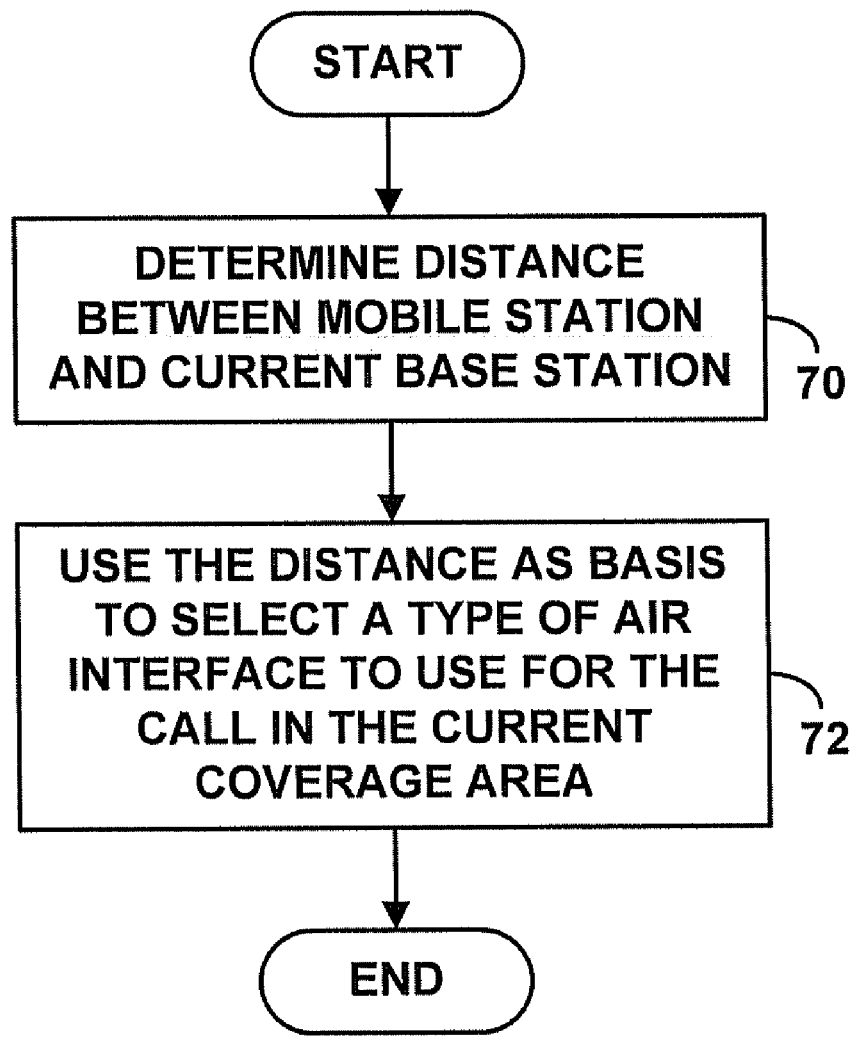
FIG. 4 is another flow chart depicting a set of functions that can be carried out in accordance with the exemplary method.

FIG. 4 is next a flow chart depicting yet another set of functions that can be carried out in accordance with the method, once more to facilitate selection of a resource-allocation type for a call in a given coverage area served by a given base station. This figure illustrates that the system may consider how far away the mobile station is from the current base station, as a factor in selecting the type of resource-allocation for the call.

As shown in FIG. 4, at step 70, the system determines a distance between the mobile station and the given base station. In turn, at step 72, the system uses the determined distance as a basis to select a type of air interface to use for the call. In this process, the act of determining the distance can involve functions such as those described above or can take other forms. Further, selecting the type of air interface may involve selecting a radio configuration (e.g., RC3 or RC4), or more specifically selecting a type (e.g., length) of Walsh code, such as a 64-bit Walsh code or a 128-bit Walsh code for instance.

An exemplary embodiment of the present method has been described above. Those of ordinary skill in the art will appreciate, however, that changes from the embodiment are possible, while remaining within the scope of the claims.

We claim:

1. In a wireless communication system comprising a plurality of base stations radiating to define a plurality of coverage areas for mobile stations, wherein during setup of a call for a mobile station in a given coverage area of a given base station, the system selects a type of resource-allocation from a plurality of types of resource-allocation and, for the call, the system then allocates base station resources of the given coverage area in accordance with the selected type of resource-allocation, a method of selecting the type of resource-allocation, the method comprising the following functions carried out by at least one network component that includes a processor, data storage, and a network connection mechanism:

determining a first distance between the mobile station and the given base station;

dynamically establishing a distance threshold based on distance between the given base station and one or more adjacent base stations serving one or more adjacent coverage areas;

making a determination of whether the first distance exceeds the dynamically established distance threshold;

if the determination is that the first distance exceeds the dynamically established distance threshold, then selecting the type of resource-allocation based on resource-availability in the one or more adjacent coverage areas; and if the determination is that the first distance does not exceed the dynamically established distance threshold, then selecting the type of resource-allocation without considering resource-availability in the one or more adjacent coverage areas, the method further comprising determining the resource-availability in the one or more adjacent coverage areas, wherein determining the resource-availability in the one or more adjacent coverage areas comprises determining an extent of base station power availability in the one or more adjacent coverage areas, and wherein selecting the type of resource-allocation based on the determined resource-availability comprises (i) if the determined extent is less than a resource threshold, then selecting a first radio configuration to use for the call in the given coverage area, and (ii) if the determined extent is not less than the resource threshold, then selecting a second radio configuration to use for the call in the given coverage area, wherein use of the first radio configuration consumes less base station power than use of the second radio configuration.

2. The method of claim 1, wherein the first radio configuration is RC3, and wherein the second radio configuration is RC4.

3. In a wireless communication system comprising a plurality of base stations radiating to define a plurality of coverage areas for mobile stations, wherein during setup of a call for a mobile station in a given coverage area of a given base station, the system selects a type of resource-allocation from a plurality of types of resource-allocation and, for the call, the system then allocates base station resources of the given coverage area in accordance with the selected type of resource-allocation, a method of selecting the type of resource-allocation, the method comprising the following functions carried out by at least one network component that includes a processor, data storage, and a network connection mechanism:

determining a distance between the mobile station and the given base station;

making a determination of whether the determined distance is greater than a threshold distance;

if the determination is that the determined distance is greater than the threshold distance, then selecting the type of resource-allocation based on base station power availability in one or more coverage areas adjacent to the given coverage area, wherein selecting the type of resource-allocation based on base station power availability in one or more coverage areas adjacent to the given coverage area comprises (i) determining an extent of base station power availability in one or more coverage areas adjacent to the given coverage area, (ii) if the determined extent is less than a threshold extent, then selecting a first air interface type to use for the call, and (iii) if the determined extent is not less than the threshold extent, then selecting a second air interface type to use for the call, wherein use of the first air interface type consumes less base station power than use of the second air interface type; and if the determination is that the determined distance is not greater than the threshold distance, then selecting the type of resource-allocation without considering base station power availability in any adjacent coverage area, the method further comprising establishing the threshold based on distance between the given base station and at least one adjacent base station.

4. The method of claim 3, wherein determining the distance between the mobile station and the given base station comprises:

determining a round trip delay for communication between the given base station and the mobile station; and determining the distance based on the round trip delay.

5. The method of claim 3, wherein determining the distance between the mobile station and the given base station comprises:

computing as the distance a geometric length between geographic coordinates of the mobile station and geographic coordinates of the given base station.

6. The method of claim 3, wherein the first air interface type uses spreading codes of a first length, and the second air interface type uses spreading codes of the a second length longer than the first length.

7. The method of claim 6, wherein the first air interface type is RC3, and the second air interface type is RC4.

8. The method of claim 3, wherein the first air interface type is RC3, and the second air interface type is RC4.

9. The method of claim 8, wherein selecting the type of resource-allocation without considering base station power availability in any adjacent coverage area comprises selecting RC4 as the air interface type.

10. The method of claim 3, additionally comprising selecting the type of resource-allocation based on whether the call is a voice call or a data call.

11. In a wireless communication system comprising a plurality of base stations radiating to define a plurality of coverage areas for mobile stations, wherein during setup of a call for a mobile station in a given coverage area of a given base station, the system selects a type of air interface spreading code to allocate for the call and the system allocates an air interface spreading code of the selected type for the call in the given coverage area, a method of selecting the type of air interface spreading code to allocate, the method comprising the following functions carried out by at least one network component that includes a processor, data storage, and a network connection mechanism:

determining a distance between the mobile station and the given base station; and using the determined distance as a basis to select the type of air interface spreading code to allocate, wherein using the determined distance as a basis to select the type of air interface spreading code comprises (i) comparing the determined distance with a threshold established dynamically based on distance between the given base station and one or more adjacent base stations, (ii) if the determined distance is greater than the threshold, then selecting the type of air interface spreading code based on base station power availability in one or more coverage areas adjacent to the given coverage area, and (iii) if the determined distance is not greater than the threshold, then selecting the type of air interface spreading code without considering base station power availability in any adjacent coverage area, and wherein selecting the type of air interface spreading code based on the base station power availability in one or more coverage areas adjacent to the given coverage area comprises (i) determining an extent of base station power availability in one or more coverage areas adjacent to the given coverage area, (ii) if the determined extent is less than a threshold extent, then selecting a first type of air interface spreading code to use for the call, and (iii) if the determined extent is not less than the threshold extent, then selecting a second type of air interface spreading code to use for the call, wherein use of the first type of air interface spreading code consumes less base station power than use of the second type of air interface spreading code.

12. In a wireless communication system comprising a plurality of base stations radiating to define a plurality of coverage areas for mobile stations, wherein during setup of a call for a mobile station in a given coverage area of a given base station, the system selects from among at least two air interface types an air interface type to use for the call in the given coverage area, wherein the at least two air interface types include a first air interface type that uses spreading codes of a first length and a second air interface type that uses spreading codes of a second length greater than the first length, and wherein the system sets up the call in the given coverage area using the selected air interface type, a method of selecting the air interface type to use for the call in the given coverage area, the method comprising the following functions carried out by at least one network component that includes a processor, data storage, and a network connection mechanism:

determining a distance between the mobile station and the given base station; and using the determined distance as a basis to select the air interface type to use for the call in the given coverage area, wherein using the determined distance comprises comparing the determined distance with a threshold established dynamically based on distance between the given base station and one or more adjacent base stations, wherein using the determined distance as a basis to select the air interface type comprises (i) making a determination of whether the distance is greater than the threshold, (ii) if the determination is that the distance is greater than the threshold, then selecting the air interface type based on base station power availability in one or more coverage areas adjacent to the given coverage area, and (iii) if the determination is that the distance is not greater than the threshold, then selecting the air interface type without consideration of base station power availability in any adjacent coverage area, and wherein selecting the air interface type based on base station power availability in one or more coverage areas adjacent to the given coverage area comprises (i) determining an extent of base station power availability in one or more coverage areas adjacent to the given coverage area, (ii) if the determined extent is less than a threshold extent, then selecting the first air interface type, and (iii) if the determined extent is not less than the threshold extent, then selecting the second air interface type, wherein use of the first air interface type consumes less base station power than use of the second air interface type.

13. The method of claim 12, wherein the first air interface type uses 64-bit Walsh codes, and the second air interface type uses 128-bit Walsh codes.

14. The method of claim 12, wherein determining the distance between the mobile station and the given base station comprises:
    determining a round trip delay for communication between the given base station and the mobile station; and
    determining the distance based on the round trip delay.

15. The method of claim 12, wherein determining the distance between the mobile station and the given base station comprises:
    computing as the distance a geometric length between geographic coordinates of the mobile station and geographic coordinates of the given base station.

16. The method of claim 12, wherein the first air interface type is RC3, the first length is 64 bits, the second air interface type is RC4, and the second length is 128 bits.

17. The method of claim 16, wherein selecting the air interface type without consideration of base station power availability in any adjacent coverage area comprises selecting RC4 as the air interface type.

18. The method of claim 12, further comprising establishing the threshold based on distance between the given base station and at least one of the one or more adjacent base stations.

* * * * *